(12) United States Patent  
Nakayama et al.

(10) Patent No.: US 12,046,097 B2
(45) Date of Patent: Jul. 23, 2024

(54) WIRELESS COMMUNICATION SYSTEM

(71) Applicant: Panasonic Intellectual Property Management Co., Ltd., Osaka (JP)

(72) Inventors: Yumiko Nakayama, Osaka (JP); Yusuke Toyofuku, Osaka (JP); Yusuke Kushiki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 76 days.

(21) Appl. No.: 17/983,804

(22) Filed: Nov. 9, 2022

(65) Prior Publication Data

US 2023/0060568 A1    Mar. 2, 2023

Related U.S. Application Data

(63) Continuation of application No. PCT/JP2020/019156, filed on May 13, 2020.

(51) Int. Cl.
    *G07C 9/32*      (2020.01)
    *G07C 9/00*      (2020.01)

(52) U.S. Cl.
    CPC ........... *G07C 9/32* (2020.01); *G07C 9/00309* (2013.01)

(58) Field of Classification Search
    CPC ....... G07C 9/32; G07C 9/00309; G06F 21/44; G06F 21/83; H04W 4/35; H04W 4/48; H04B 1/38

(Continued)

(56) References Cited

U.S. PATENT DOCUMENTS 7,305,254 B2 * 12/2007 Findikli ............ H04M 1/72409
                                                       713/168
7,444,388 B1 * 10/2008 Svendsen ................ G06F 15/16
                                                       709/217

(Continued)

FOREIGN PATENT DOCUMENTS

JP      2006-514348      4/2006
JP      2010-534286     11/2010

(Continued)

OTHER PUBLICATIONS

International Search Report issued Jul. 21, 2020 in corresponding International Application No. PCT/JP2020/019156.

*Primary Examiner* — Nam V Nguyen
(74) *Attorney, Agent, or Firm* — WENDEROTH, LIND & PONACK, L.L.P.

(57) ABSTRACT

A wireless communication system is mounted on a moving body, and includes a wireless communication unit, a terminal identification (ID) reader, an operation receiver, a moving body state detector, a communication permission list, and a controller. The wireless communication unit transmits and receives information to and from the wireless terminal. The terminal ID reader reads, from the wireless terminal, ID information that identifies the wireless terminal. The operation receiver receives a specific operation from a user. The moving body state detector detects an operation state of the moving body. The communication permission list stores the ID information of a wireless terminal that is permitted to communicate with the wireless communication unit. When the operation receiver receives the operation from the user and the moving body state detector detects that the moving body is in a preset operation state, the controller adds, in the communication permission list, the ID information of the wireless terminal read by the terminal ID reader.

9 Claims, 5 Drawing Sheets

(58) Field of Classification Search
USPC .............................. 340/5.2, 5.21, 5.22, 5.24
See application file for complete search history.

(56) References Cited

U.S. PATENT DOCUMENTS

| | | | | |
|---|---|---|---|---|
| 8,509,691 | B2 * | 8/2013 | Lydon ..................... | G06F 21/31 |
| | | | | 361/679.09 |
| 8,565,820 | B2 * | 10/2013 | Riemer ................... | H04M 1/67 |
| | | | | 455/345 |
| 8,798,542 | B2 * | 8/2014 | Oba ...................... | H04W 12/50 |
| | | | | 455/41.2 |
| 8,925,069 | B2 * | 12/2014 | Louboutin ............ | H04W 12/06 |
| | | | | 713/168 |
| 8,989,663 | B2 * | 3/2015 | Ishibashi ........... | H04M 1/72412 |
| | | | | 235/382 |
| 9,370,030 | B2 * | 6/2016 | Takayanagi ....... | H04W 52/0209 |
| 10,321,516 | B2 * | 6/2019 | Ohhira ................. | H04W 84/18 |
| 10,327,124 | B2 * | 6/2019 | Tsuji ...................... | H04W 4/80 |
| 2004/0050932 | A1 * | 3/2004 | Fukada .............. | G06Q 20/3221 |
| | | | | 235/380 |
| 2005/0149741 | A1 | 7/2005 | Humbel | |
| 2007/0080823 | A1 * | 4/2007 | Fu ......................... | G08C 23/04 |
| | | | | 340/4.3 |
| 2014/0342670 | A1 * | 11/2014 | Kang ..................... | H04L 69/14 |
| | | | | 455/67.11 |

FOREIGN PATENT DOCUMENTS

| | | |
|---|---|---|
| JP | 5307694 | 10/2013 |
| JP | 5460304 | 4/2014 |
| JP | 2015-95053 | 5/2015 |
| WO | 2009/014943 | 1/2009 |

\* cited by examiner

WIRELESS COMMUNICATION SYSTEM

TECHNICAL FIELD

The present disclosure relates to a wireless communication system.

BACKGROUND ART

PTL 1 discloses a voice system, a control method, and a control program for the voice system, which are configured to prevent erroneous operation due to an installation error of a wireless microphone and to automatically read various parameters related to the wireless microphone corresponding to a user. The voice system, the control method, and the control program include an information terminal that stores user ID data, a wireless microphone transmitter including transmission-side circuit means provided for voice signal input, modulation, and radio wave transmission, and a receiver including reception-side circuit means provided for telephone call reception, voice signal demodulation, and voice signal output. As a result, the burden on the operator can be reduced, and furthermore, erroneous operation due to erroneous input can be suppressed.

CITATION LIST

Patent Literature

PTL 1: Japanese Patent No. 5307694

SUMMARY OF THE INVENTION

In a moving body, an announcement using a microphone has been frequently used. Use of wireless microphones has been increasing, and the convenience for crews has been improved. However, due to the communication becoming wireless, troubles such as theft, mischief, and mislaying of the microphones has become more frequent. For example, mischief by a user other than the crew possibly occurs, the mischief being the user making an announcement using a microphone prepared in advance.

The present disclosure provides a wireless communication system for a wireless terminal.

A wireless communication system in the present disclosure is mounted on a moving body, and includes a wireless communication unit, a terminal identification (ID) reader, an operation receiver, a moving body state detector, a communication permission list, and a controller. The wireless communication unit transmits and receives information to and from the wireless terminal. The terminal ID reader reads, from the wireless terminal, ID information that identifies the wireless terminal. The operation receiver receives a specific operation from a user. The moving body state detector detects an operation state of the moving body. The communication permission list stores the ID information of a wireless terminal that is permitted to communicate with the wireless communication unit. When the operation receiver receives the operation from the user and the moving body state detector detects that the moving body is in a preset operation state, the controller registers, in the communication permission list, the ID information of the wireless terminal read by the terminal ID reader.

The wireless communication system of the present disclosure is effective for preventing theft and mischief of the wireless terminal by a passenger.

DESCRIPTION OF EMBODIMENT

Hereinafter, exemplary embodiments are described below in detail with reference to the drawings as appropriate. However, unnecessarily detailed description may be omitted. For example, the detailed description of already well-known matters and the overlapping description of substantially the same configurations may be omitted. This is to avoid an unnecessarily redundant description below and to facilitate understanding by those skilled in the art.

Note that the accompanying drawings and the description below are provided for those skilled in the art to fully understand the present disclosure, and are not intended to limit the subject matter described in the scope of claims.

First Exemplary Embodiment

Figure 2:
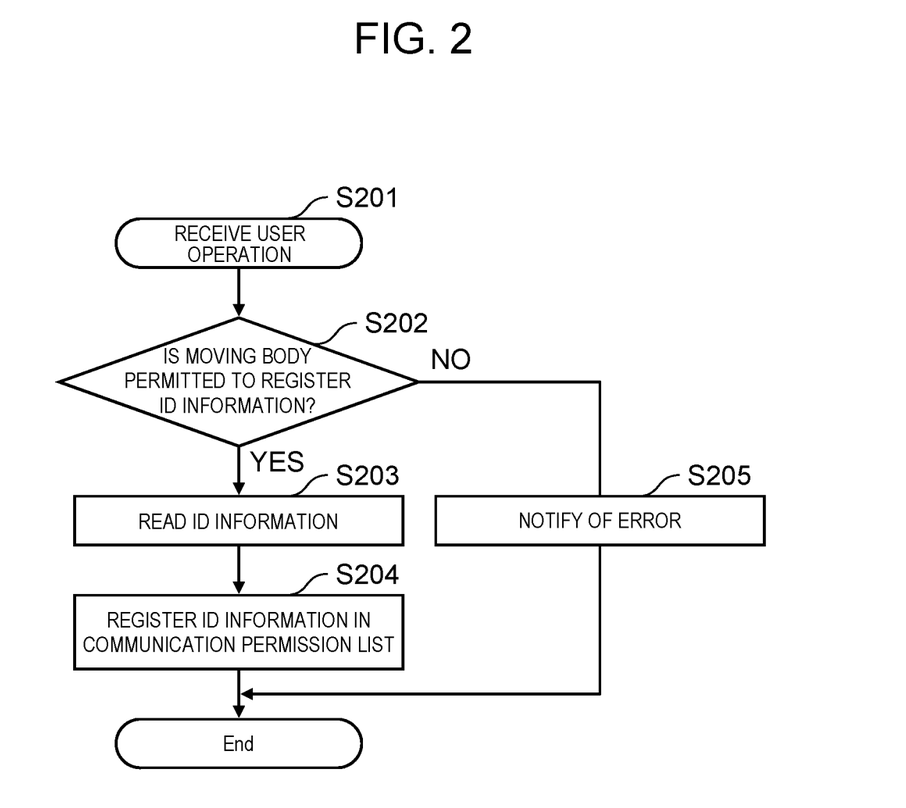
FIG. 2 is a flowchart showing an operation of registering a communication permission list of the wireless communication system in the first exemplary embodiment.
Figure 3:
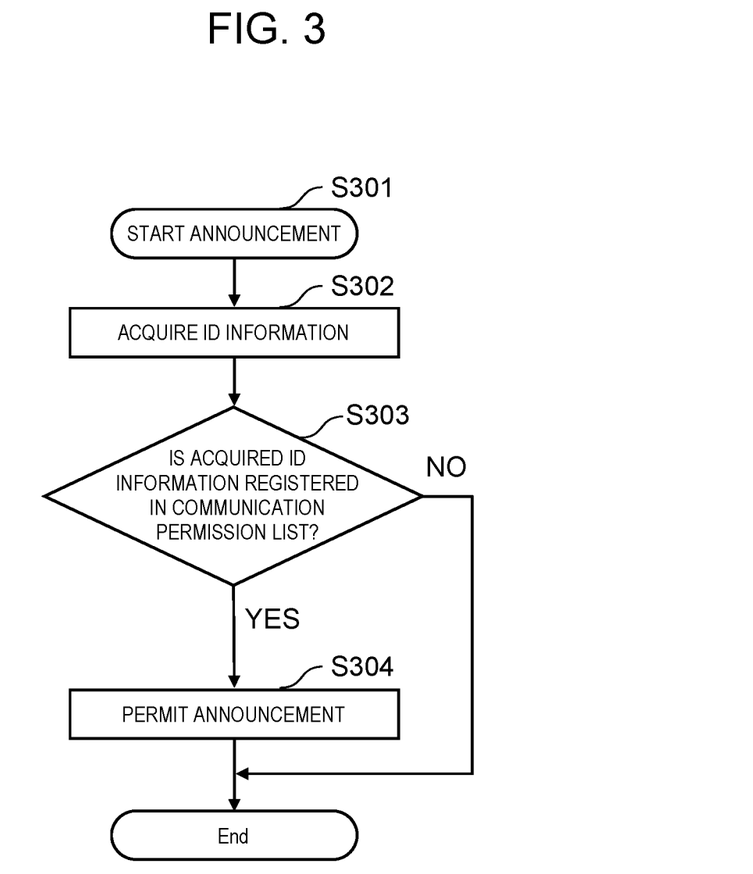
FIG. 3 is a flowchart showing an operation of confirming the communication permission list of the wireless communication system in the first exemplary embodiment.

Hereinafter, a first exemplary embodiment is described below with reference to FIGS. 1 to 3.

[1-1. Configuration]

[1-1-1. Configuration of Wireless Communication System]

Figure 1:
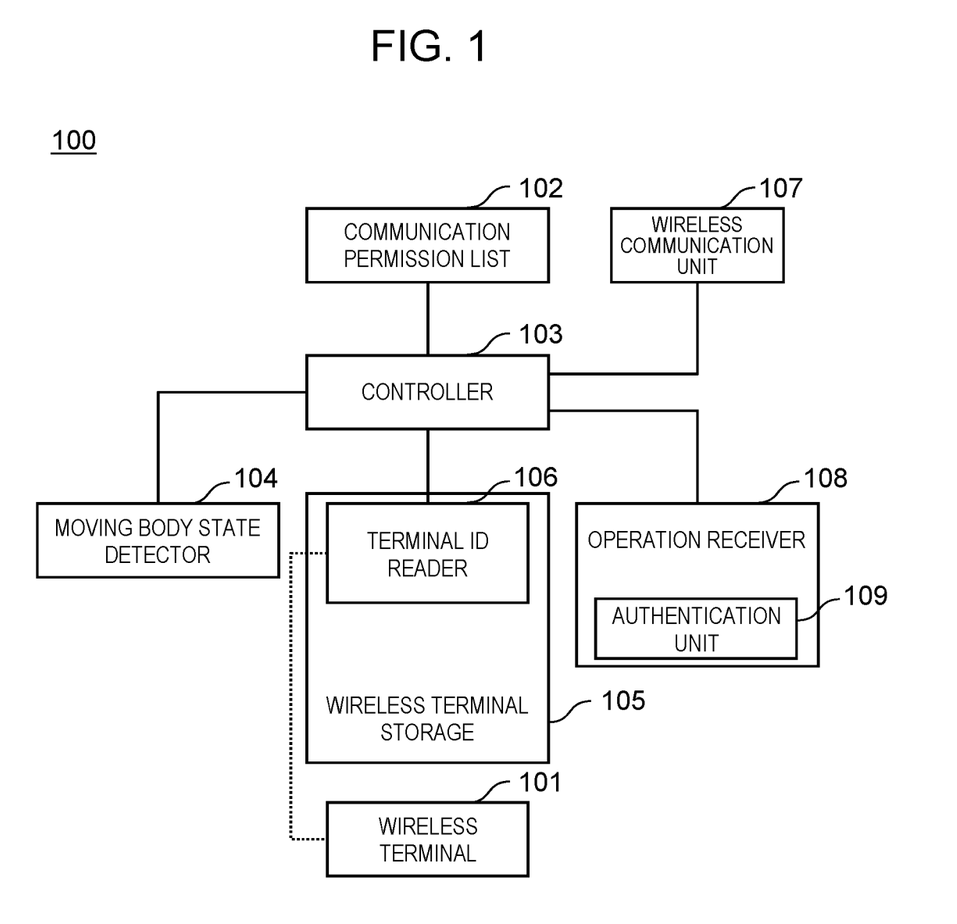
FIG. 1 is a block diagram showing a configuration of a wireless communication system according to a first exemplary embodiment.

FIG. 1 is a block diagram showing a configuration of a wireless communication system according to the first exemplary embodiment. Wireless communication system 100 includes wireless terminal 101, communication permission list 102, controller 103, moving body state detector 104, wireless terminal storage 105, terminal ID reader 106, wireless communication unit 107, and operation receiver 108.

Wireless terminal 101 is a terminal that can wirelessly communicate with controller 103. Specific examples of wireless terminal 101 include a wireless microphone, a tablet terminal, and a remote controller.

moving body state detector 104 is hardware or software that detects a moving body state (operation state) and notifies controller 103 of the detected state. The moving body state is information indicating a state of hardware of the moving body or a service state of operation, and includes, for example, an engine state (started, stopped, or the like) of the moving body, states whether a passenger is boarded or not, whether the moving body is in operation or not, whether the moving body is under maintenance or not, and whether the moving body is parked or not, and an open and close state of a door.

Operation receiver 108 is a device that notifies controller 103 of the operation received from the user. Specific examples of operation receiver 108 include a tablet terminal, a touch panel, a physical switch, and a microphone for recording the voice of the user.

Wireless terminal storage 105 is a mechanism for storing wireless terminal 101. Wireless terminal storage 105 can be a mechanism having a shape such as a stand, a dock, a holder, or a case of wireless terminal 101, but any mechanism may be used as long as terminal ID reader 106 to be described later can identify wireless terminal 101 from which ID information is to be read. A plurality of wireless terminals 101 and a plurality of wireless terminal storages 105 may be present in the moving body.

Terminal ID reader 106 is hardware or software that reads ID information of wireless terminal 101 stored in wireless terminal storage 105 and notifies controller 103 of the read ID information. Here, the ID information is information that can uniquely identify wireless terminal 101. For example, the information can include the Media Access Control (MAC) address of a network device included in wireless terminal 101, a serial number assigned to wireless terminal 101, and the like. Terminal ID reader 106 can be configured to, for example, read the ID information by communicating with wireless terminal 101 through an electrode provided in wireless terminal storage 105. Note that terminal ID reader 106 may read the ID information by directly communicating with wireless terminal 101. Further, terminal ID reader 106 may be incorporated in wireless terminal storage 105.

Communication permission list 102 is hardware or software that stores the ID information notified from controller 103. Specifically, the list can be an array implemented on a memory, a relational database, a key-value store (KVS) database, or the like.

Controller 103 is software and hardware that determine whether or not to register, in communication permission list 102, the ID information notified from terminal ID reader 106 based on the information notified from moving body state detector 104 and operation receiver 108.

Wireless communication unit 107 is hardware for controller 103 to communicate with wireless terminal 101 and software for controlling the hardware. However, wireless communication unit 107 communicates only with wireless terminal 101 having ID information that matches the ID information stored in communication permission list 102. A system of the wireless communication may be any system as long as digital or analog signals can be exchanged between controller 103 and wireless terminal 101. Specifically, the system can be a wireless Local Area Network (LAN) (various standards of IEEE 802.11), a digital enhanced cordless telecommunications (DECT) system, or the like.

[1-2. Operation]

An operation of wireless communication system 100 having the above configuration is described below with reference to FIG. 2. Wireless communication system 100 performs each operation of communication processing with wireless terminal 101 based on the moving body state and the user operation. Hereinafter, each of the operations is described in detail.

[1-2-1. Instruction to Start Acquisition of ID Information of Wireless Terminal]

Operation receiver 108 receives the operation of registering the ID information of wireless terminal 101 by a pilot or a crew (user) (S201).

In the present exemplary embodiment, a tablet terminal installed in a cockpit is assumed as a specific example of operation receiver 108. When the user (for example, pilot) clicks a button displayed on the tablet terminal, the operation of acquiring the ID information of wireless terminal 101 is started. A specific flow of the operation of acquiring the ID information is described below.

Note that the reason why the installation place of operation receiver 108 is set in the cockpit is that it is not appropriate that a passenger operates these units and only a crew such as a pilot or a cabin attendant (CA) can handle these units. However, the operation receiver is not necessarily installed in the cockpit. For example, as shown in FIG. 1, when operation receiver 108 includes authentication unit 109 that can perform such as password authentication, biometric authentication, or ID card authentication, a person who operates the receiver can be authenticated, and the person who can operate the receiver can be restricted, operation receiver 108 may be in a cabin.

[1-2-2. Acquisition of Moving Body State]

When the user performs the operation of registering the ID information of wireless terminal 101 through the tablet terminal, controller 103 acquires the moving body state from moving body state detector 104 installed in the moving body. Here, the moving body state is acquired in order to perform the operation of registering the ID information while the moving body is parked. Here, "parked" refers to a state in which a moving body is not providing service to passengers. For example, the state is, for example, a state in which maintenance of the moving body is being performed before the passenger boards the moving body.

In the present exemplary embodiment, a sensor that monitors an engine state installed in the cockpit is assumed as moving body state detector 104. Controller 103 acquires information on whether or not the moving body is parked by acquiring the detection result of the sensor. When the engine is stopped, it is determined that the moving body is parked, and when the engine is operating, it is determined that the moving body is not parked.

[1-2-3. Determination on Whether or Not to Permit Acquisition of ID Information of Wireless Terminal]

Controller 103 determines whether or not the moving body state acquired from moving body state detector 104 is a state in which registration of ID information of wireless terminal 101 set in advance is permitted (S202). For example, it is determined that the registration of the ID information is permitted when the moving body is parked, and it is determined that the registration of the ID information is not permitted when the moving body is not parked. In which case the registration of the ID information is permitted is stored in advance in controller 103 for each state that can be detected by moving body state detector 104 installed in the moving body or for each combination of the states.

In this manner, the period in which the operation of registering the ID information from operation receiver 108 is permitted is limited in order to prevent communication permission list 102 from being updated at an unintended timing. If the update of communication permission list 102 is permitted at the timing other than during the maintenance of the moving body, there is a possibility that a malicious passenger willfully registers a wireless communication terminal that can communicate with the present system. In addition, if communication permission list 102 is initialized during the operation of the moving body due to some operation mistake, providing of service in the moving body is hindered.

When the moving body state is in the state in which the registration of the ID information is permitted (YES in S202), controller 103 acquires the ID information as described below. When the moving body state is in the state in which the registration of the ID information is not permitted (NO in S202), controller 103 notifies the user of an error through operation receiver 108 (S205). For example, a message indicating that acquisition of the ID information cannot be started is displayed on the screen of the tablet terminal.

[1-2-4. Acquisition and Registration of ID Information of Wireless Terminal]

When the moving body state is in the state in which the registration of the ID information is permitted, terminal ID reader 106 reads the ID information of wireless terminal 101 stored in wireless terminal storage 105 (S203). For example, a wireless terminal charger installed in the cockpit is assumed as wireless terminal storage 105. When the user instructs to start the acquisition of the ID information and the moving body is in the state in which the registration of the ID information is permitted, terminal ID reader 106 acquires the MAC address (ID information) of wireless terminal 101 stored in the charger and notifies controller 103 of the acquired MAC address. Controller 103 registers the notified MAC address of wireless terminal 101 in communication permission list 102 implemented in the storage medium (S204). In a case where there is a plurality of wireless terminal storages 105 in the moving body, the stored ID information may be read in parallel or sequentially for all the wireless terminal storages.

When the registration of the ID information in communication permission list 102 is completed, controller 103 notifies the user that the processing has been completed. For example, a message indicating that the processing has been completed is displayed on the screen of the tablet terminal.

[1-2-5. Processing of Communication Request]

In the present exemplary embodiment, a description is made while assuming that a wireless microphone is an example of wireless terminal 101. Hereinafter, the description is made using FIG. 3.

When the crew who provides service in the moving body makes an announcement by voice in the moving body, a wireless microphone having the ID information registered in the communication permission list by the above-described procedure is used. The wireless microphone includes a microphone that inputs the voice.

When the crew enables the use of the wireless microphone, the wireless microphone starts communication with wireless communication unit 107 (S301). Here, "enabling the use of the wireless microphone" refers to any operation (or a combination thereof) performed by the user in the process of using the wireless microphone, such as turning on the power, taking out from the charger, or pressing a call switch.

Wireless communication unit 107 acquires the ID information of the wireless microphone from among the information transmitted from the wireless microphone (S302). For example, in the case of using the MAC address of wireless communication means of the wireless microphone as the ID information, wireless communication unit 107 reads the Internet Protocol (IP) address of the wireless microphone from the information stored in the wireless LAN packet received from the wireless microphone. Then, by acquiring the MAC address of a transmission source from the IP address that is read using the Address Resolution Protocol (ARP) or the like, wireless communication unit 107 can acquire the ID information of the wireless microphone being the transmission source.

Using the ID information acquired in this manner, wireless communication unit 107 determines whether to permit communication with the wireless microphone. Here, "permitting communication" does not necessarily mean determination of communication availability at the level of a communication protocol such as a wireless LAN (IEEE 801.11) or Transmission Control Protocol/Internet Protocol (TCP/IP). At the level of the communication protocol, it is also possible to perform processing of maintaining the connection and not performing subsequent operations.

Controller 103 collates whether or not the ID information acquired by wireless communication unit 107 is registered in communication permission list 102 (S303). When the ID information is registered in communication permission list 102 (YES in S303), the announcement from the wireless microphone is permitted (S304). Specifically, controller 103 receives a packet transmitted from the wireless microphone, decodes voice data stored in the packet, and broadcasts the voice data in the moving body. On the other hand, when the ID information is not registered in communication permission list 102 (NO in S303), wireless communication unit 107 discards the packet received from the wireless microphone and does not receive the distribution of the voice by the communication from the wireless microphone.

[1-3. Effects and the Like]

With the above configuration and operation, controller 103 can register the ID information of wireless terminal 101 to communicate with wireless communication unit 107 when the moving body is in an appropriate state.

As a result, a malicious passenger can be prevented from registering a wireless communication terminal that can communicate with the present system without permission, and thus, the mischief using a wireless terminal carried by a person other than the crew can be prevented.

Second Exemplary Embodiment

A second exemplary embodiment is described below with reference to FIGS. 4 and 5.

[2-1. Configuration]

Figure 4:
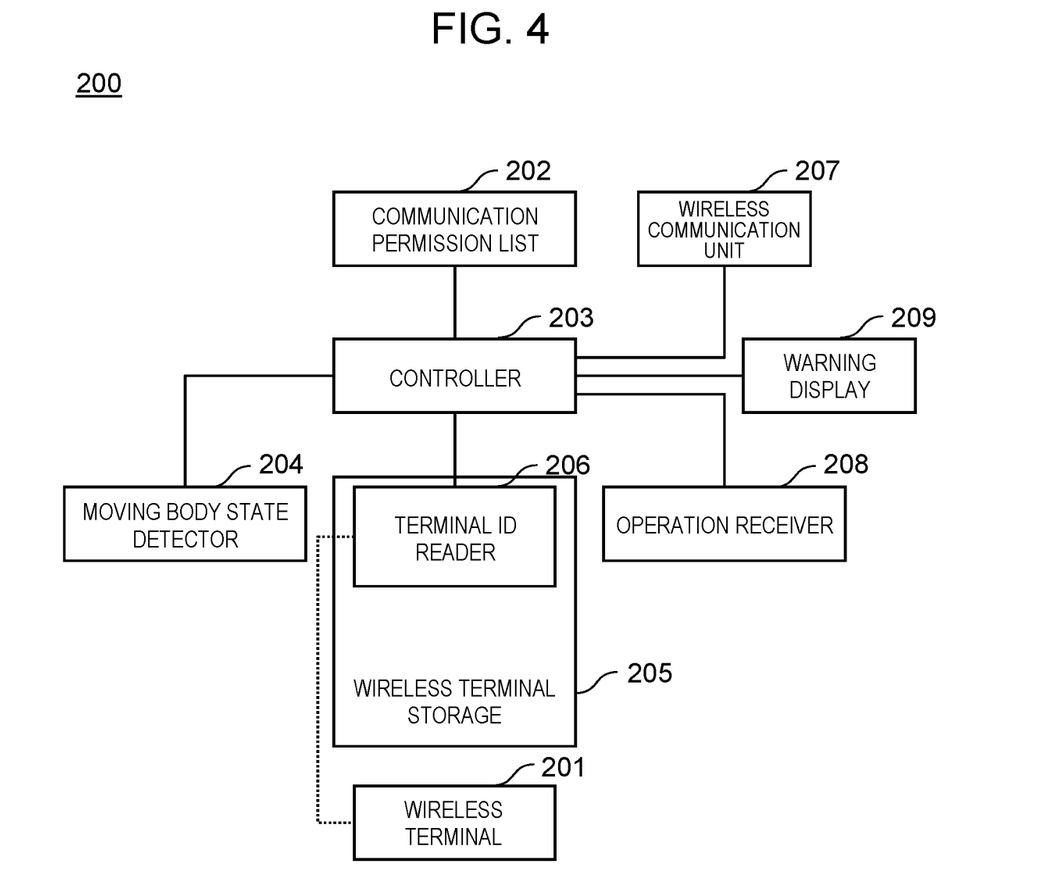
FIG. 4 is a block diagram showing a configuration of a wireless communication system according to a second exemplary embodiment.
Figure 5:
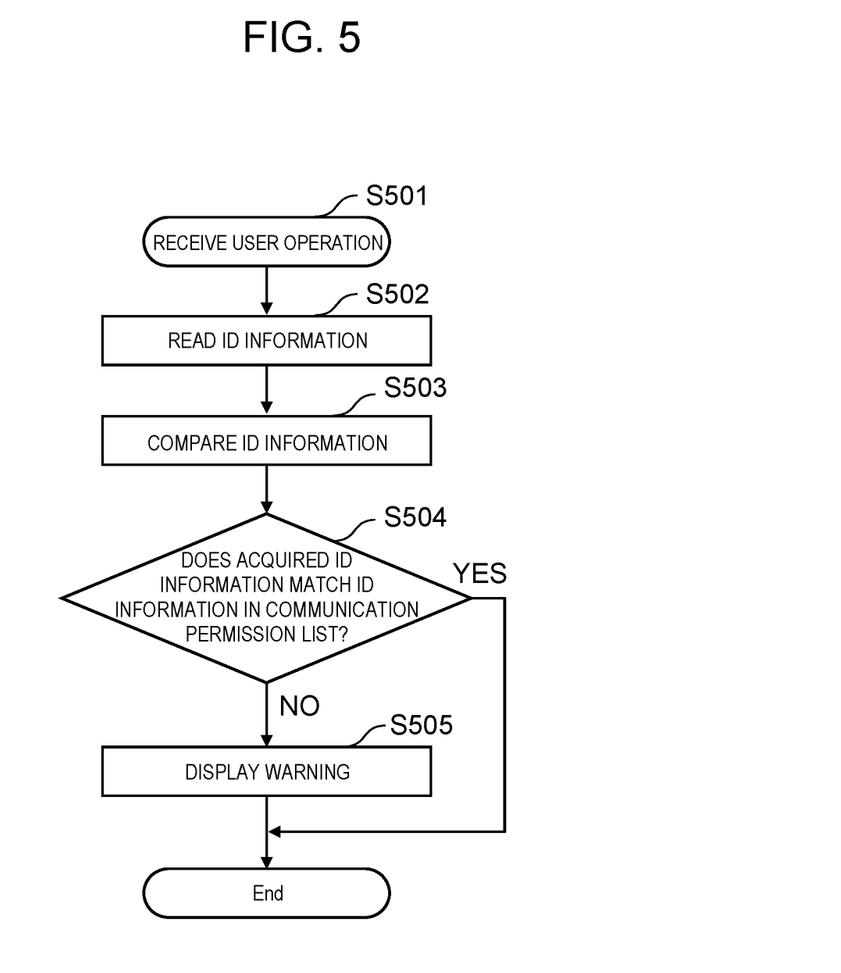
FIG. 5 is a flowchart showing a warning display operation of the wireless communication system according to the second exemplary embodiment.

FIG. 4 is a block diagram showing a configuration of a wireless communication system according to a second exemplary embodiment. Wireless communication system 200 includes wireless terminal 201, communication permission list 202, controller 203, moving body state detector 204, wireless terminal storage 205, terminal ID reader 206, wireless communication unit 207, operation receiver 208, and warning display 209.

Wireless communication system 200 in the present exemplary embodiment includes warning display 209 in addition to the configuration of the first exemplary embodiment.

As described later, warning display 209 displays a warning in accordance with an instruction from controller 203.

[2-2. Operation]

Hereinafter, an operation of wireless communication system 200 configured as described above is described. Wireless communication system 200 performs each operation of communication processing with wireless terminal 201 based on the moving body state and the user operation. Hereinafter, each of the operations is described in detail.

[2-2-1. Acquisition of ID Information of Wireless Terminal]

In the present exemplary embodiment, the ID information of wireless terminal 201 is registered in communication permission list 202 by the same operation as that described in the first exemplary embodiment.

[2-2-2. Confirmation of ID Information of Wireless Terminal]

The operation of confirming the ID information of the wireless terminal is performed, for example, in a time zone in which all of wireless terminals 201 should be stored in a dock or the like in a service status in the operation of the moving body (in the case of an aircraft, the time zone may be immediately before takeoff, immediately before landing, or the like). This is to check whether wireless terminal 201 is stolen or whether wireless terminal 201 is mislaid. Note that operation receiver 208 is not necessarily the same as operation receiver 108 used at the time of registration.

Operation receiver 208 receives the operation of confirming the ID information of wireless terminal 201 by a pilot or a crew (S501). Also in the present exemplary embodiment, a tablet terminal is assumed as a specific example of operation receiver 208. When the user clicks a button displayed on the tablet terminal, the operation of confirming the ID information of wireless terminal 201 is started.

When the operation of confirming the ID information of the wireless terminal is received, terminal ID reader 206 reads the ID information of wireless terminal 201 stored in wireless terminal storage 205 (S502). As a method of reading the ID information, the same method can be used as that described in the first exemplary embodiment. In a case where there is a plurality of wireless terminal storages 205 in the moving body, the ID information of stored wireless terminal 201 may be read in parallel or sequentially for all the wireless terminal storages. The read ID information is notified to controller 203.

Subsequently, controller 203 compares and collates all the pieces of acquired ID information (a first wireless terminal ID group) with a list of ID information (a second wireless terminal ID group) registered in communication permission list 202 (terminal list) (S503). Then, controller 203 confirms whether all the pieces of acquired ID information matches the ID information registered in communication permission list 202 (S504). When all the pieces of acquired ID information match the ID information registered in communication permission list 202 (YES in S504), controller 203 completes the confirmation of the ID information of wireless terminal 201. At this time, controller 203 may display the confirmation result on the screen of operation receiver 208, or may turn on a light-emitting diode (LED). When all the pieces of acquired ID information do not match the ID information registered in communication permission list 202 (NO in S504), controller 203 notifies of the result to warning display 209. Specifically, when there is a piece of ID information that is not registered in communication permission list 202 among the acquired pieces of ID information, or when one or a plurality of pieces of ID information among the ID information registered in communication permission list 202 are not included in the acquired ID information, controller 203 notifies of the result to warning display 209. Upon receiving the notification, warning display 209 displays a warning to the user (S505). As a method of displaying the warning, a message may be displayed on the screen, or an LED may be turned on.

[2-3. Effects and the Like]

According to the above configuration and operation, the crew can check during the operation of the moving body, according to the moving state, whether one or a plurality of wireless terminals 201 are in an unusable state due to theft or mislaying, whether an unintended wireless terminal brought by a malicious passenger is used, or the like.

Other Exemplary Embodiments

The first and second exemplary embodiments have been described above as examples of the technique disclosed in the present application. However, the techniques in the present disclosure are not limited to the above exemplary embodiments, and can also be applied to exemplary embodiments in which change, substitution, addition, omission, and the like are performed. Further, a new exemplary embodiment may be made by combining the components described in the first and second exemplary embodiments.

Accordingly, hereinafter, other exemplary embodiments are exemplified.

In the first and second exemplary embodiments, the controller is software and hardware that compare the acquired ID information with the ID information registered in the communication permission list based on the moving body state and the user operation, and determine whether or not to permit the registration and display the warning. However, the controller may have any configuration as long as the controller can determine whether or not to permit the registration in the communication permission list. Therefore, the controller is not limited to a single machine. For example, the controller may be divided into software for determining whether or not to permit the registration and software for determining whether or not to display the warning. In addition, a part of functions may be performed by a system installed outside the moving body, such as a cloud.

In the first and second exemplary embodiments, a configuration of reading the ID information by communicating with the wireless terminal through the electrode provided in the wireless terminal storage has been exemplified as a method of reading the ID information of the wireless terminal. However, the method of reading from the wireless terminal is not necessarily performed by electronic communication, and may be any method as long as the ID information unique to the terminal can be detected, such as a configuration in which a unique optical pattern (for example, a barcode) of each terminal attached to the wireless terminal is read by a camera or the like, or a configuration in which physical unevenness unique to each terminal formed in a housing of the wireless terminal is detected by a sensor.

In the first exemplary embodiment, the timing at which the reading of the ID information of the wireless terminal is permitted has been exemplified as the timing when the moving body is parked. However, the timing at which the reading of the ID information is permitted is not limited to this timing as long as the timing is set to the one when only the crews and mechanics are boarded on the aircraft (or in the case of remote operation, no one needs to be in the moving body) and when the operation by the malicious passenger cannot be performed. Therefore, the timing at which the reading is permitted is not limited to when the moving body is parked. For example, the reading may be permitted when the door of the cockpit is closed.

In addition, in the first exemplary embodiment, as means for determining whether or not the vehicle is parked, an example has been described in which the sensor for monitoring the engine state installed in the cockpit is used and it is determined that the vehicle is parked when the engine is stopped and not parked when the engine is operating. However, the method of determining whether or not the vehicle is parked is not limited thereto. Whether or not the vehicle is parked may be determined from information on the operating state of onboard devices other than the engine and the service providing state in the aircraft, or may be determined by acquiring a result of whether or not the vehicle is parked, the result being input by the crew.

In the first exemplary embodiment, the cockpit has been exemplified as an installation place of the wireless terminal storage and the operation receiver. However, the wireless terminal storage and the operation receiver may be installed anywhere as long as the crew can operate the terminal. For example, the wireless terminal storage and the operation receiver may be installed in the cabin.

Although the communication permission list in the second exemplary embodiment is prepared in the same manner as in the first exemplary embodiment, the method of creating the communication permission list is not limited thereto. For example, the communication permission list may be hard-coded (including a state manually set in software in advance or the like) for each moving body.

In addition, the wireless communication system according to the present disclosure is effective for preventing theft and mischief of the wireless terminal by a passenger.

INDUSTRIAL APPLICABILITY

The present disclosure can be used in a system for providing a service in a moving body using a wireless terminal.

REFERENCE MARKS IN THE DRAWINGS 101, 201 wireless terminal
102, 202 communication permission list
103, 203 controller
104, 204 moving body state detector
105, 205 wireless terminal storage
106, 206 terminal ID reader
107, 207 wireless communication unit
108, 208 operation receiver
109 authentication unit
209 warning display

The invention claimed is:

1. A wireless communication system that is mounted on a moving body and communicates with a wireless terminal, the wireless communication system comprising:
a wireless communication unit that transmits and receives information to and from the wireless terminal;
a terminal identification (ID) reader that reads, from the wireless terminal, ID information that identifies the wireless terminal;
an operation receiver that receives an operation from a user;
a moving body state detector that detects an operation state of the moving body;
a communication permission list that stores the ID information of the wireless terminal that is permitted to communicate with the wireless communication unit; and
a controller,
wherein when the operation receiver receives the operation from the user and the moving body state detector detects that the moving body is in a preset operation state, the controller registers, in the communication permission list, the ID information of the wireless terminal read by the terminal ID reader.

2. The wireless communication system according to claim 1, wherein the terminal ID reader reads the ID information of the wireless terminal stored in a mechanism that stores the wireless terminal.

3. The wireless communication system according to claim 1, wherein when the operation receiver receives the operation from the user and the moving body state detector detects that the moving body is in a parked state, the controller registers, in the communication permission list, the ID information of the wireless terminal read by the terminal ID reader.

4. The wireless communication system according to claim 1, wherein the terminal ID reader is installed in a cockpit of the moving body.

5. The wireless communication system according to claim 1, wherein the operation receiver includes an authentication unit configured to restrict the user to operate.

6. The wireless communication system according to claim 1, wherein
the wireless terminal includes a microphone, and
the controller is configured to
broadcast, in the moving body, a voice input from the microphone when the ID information of the wireless terminal is registered in the communication permission list, and
not broadcast, in the moving body, the voice input from the microphone when the ID of the wireless terminal is not registered in the communication permission list.

7. A wireless communication system that is mounted on a moving body and communicates with a wireless terminal, the wireless communication system comprising:
a terminal identification (ID) reader that reads, from the wireless terminal, ID information that identifies the wireless terminal;
an operation receiver that receives an operation from a user;
a communication permission list that stores the ID information of the wireless terminal;
a warning display; and
a controller,
wherein the controller is configured to
collate a first wireless terminal ID group with a second wireless terminal ID group, the first wireless terminal ID group being read from the wireless terminal by the terminal ID reader at a time point when the operation receiver receives the operation from the user, the second wireless terminal ID group being stored in the communication permission list, and
cause a warning to be displayed in the warning display when ID information not included in the first wireless terminal ID group is present in the second wireless terminal ID group.

8. The wireless communication system according to claim 7, wherein the controller causes the warning to be displayed in the warning display when ID information not included in the second wireless terminal ID group is present in the first wireless terminal ID group.

9. The wireless communication system according to claim 7, wherein the second wireless terminal ID group is ID information read by the ID reader before the first wireless terminal ID group is read and stored in the communication permission list.

* * * * *